(No Model.)

C. A. LINES.
Compound Tool.

No. 236,711.  Patented Jan. 18, 1881.

WITNESSES.
Daniel S. Henney Jr.
Lorenzo B. Norton

INVENTOR.
Charles A. Lines
by Geo. Perry
Atty

UNITED STATES PATENT OFFICE.

CHARLES A. LINES, OF NEW HAVEN, CONNECTICUT.

COMPOUND TOOL.

SPECIFICATION forming part of Letters Patent No. 236,711, dated January 18, 1881.

Application filed December 2, 1880. (No model.)

*To all whom it may concern:*

Be it known that I, CHARLES A. LINES, of New Haven, in the county of New Haven and State of Connecticut, have invented a new, useful, and Improved Compound Tool, of which the following is a description.

Figure 1:
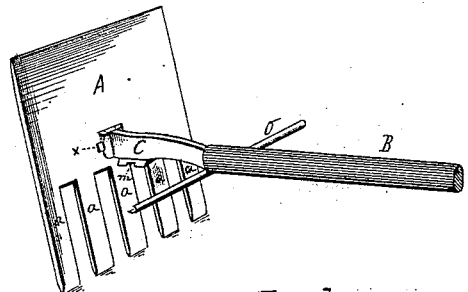
Figure 5:
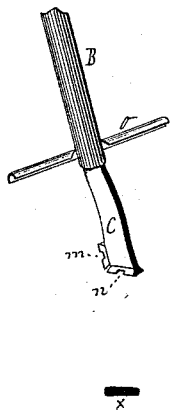
Figure 2:
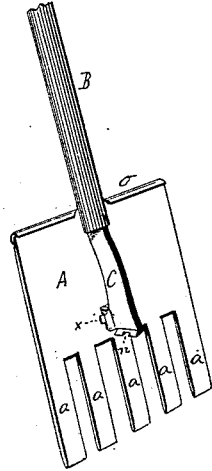
Figure 3:
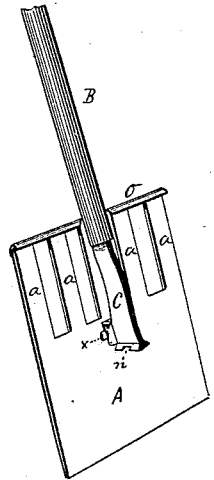
Figure 4:
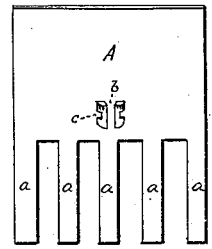

In the drawings, Figure 1 is a perspective view of the tool in the form in which it is used as a rake and a hoe. Figs. 2 and 3 are perspective views of it in the forms in which it is used as a fork and a shovel. Fig. 4 is a view of the blade and teeth or tines, and Fig. 5 is a view of the shank and a portion of the handle.

To enable others to make and use my improved tool, I will describe it in detail.

The blade A and the teeth or tines indicated by the letter $a$ may be forged into the form shown, or may be cast of malleable iron. The blade and teeth may be made in the same plane, or both blade and teeth may be slightly curved. A projection for holding the shank is centrally formed on the blade, with the undercut slot $b$ and with the key-seat $c$. The shank C is made in the form shown in the figures, with a dovetailed end, in which the key-seat $n$ is formed, and with the dovetailed projection on its under side, in which the key-seat $m$ is formed. Both the end of the shank and the projection on its under side are made to fit in the slot $b$. To the shank C the cross-piece $o$, made of sheet metal in the form shown, is attached. The handle B (represented as broken off) is a straight handle, and passes onto a tang formed on the shank C. The key $x$ fastens the blade and teeth to the shank.

The parts being constructed as above described, and as shown, the blade and teeth being fastened to the end of the shank form a rake and a hoe, as shown in Fig. 1. The blade and tines being fastened to the projection on the under side of the shank form a fork, as shown in Fig. 2, and the blade and tines being reversed form a shovel, as shown in Fig. 3.

Having described my improved compound tool, what I claim as new, and desire to secure by Letters Patent, is—

The compound tool herein described, consisting of the blade A and teeth $a$, made in one piece, and having a centrally-arranged projection, in which the undercut slot $b$ and key-seat $c$ are made, of the shank C, having a dovetailed end, in which the key-seat $n$ is formed, and also a dovetailed projection on its under side, in which the key-seat $m$ is formed, of the cross-piece $o$ attached to the shank, of the key $x$, and handle B, all substantially as shown and described.

CHARLES A. LINES.

Witnesses:
 GEORGE TERRY,
 DANIEL S. GLENNEY, Jr.